United States Patent
Hilton

(10) Patent No.: US 7,124,105 B2
(45) Date of Patent: Oct. 17, 2006

(54) CASH FLOW OPTIMIZATION USING A GENETIC ALGORITHM

(75) Inventor: Kenneth W. Hilton, Half Moon Bay, CA (US)

(73) Assignee: Intuit Inc., Mountain View, CA (US)

( * ) Notice: Subject to any disclaimer, the term of this patent is extended or adjusted under 35 U.S.C. 154(b) by 147 days.

(21) Appl. No.: 10/349,700

(22) Filed: Jan. 22, 2003

(65) Prior Publication Data

US 2004/0143524 A1 Jul. 22, 2004

(51) Int. Cl.
G06Q 40/00 (2006.01)
(52) U.S. Cl. .......................... 705/36; 705/35
(58) Field of Classification Search ................ 705/37, 705/36, 35
See application file for complete search history.

(56) References Cited

U.S. PATENT DOCUMENTS

| | | | |
|---|---|---|---|
| 5,126,936 A | 6/1992 | Champion et al. | |
| 5,255,345 A | 10/1993 | Shaefer | |
| 5,644,727 A | 7/1997 | Atkins | |
| 5,761,442 A | 6/1998 | Barr et al. | |
| 5,845,266 A | 12/1998 | Lupien et al. | |
| 5,852,811 A | 12/1998 | Atkins | |
| 5,875,437 A | 2/1999 | Atkins | |
| 5,999,918 A | 12/1999 | Williams et al. | |
| 6,012,046 A | 1/2000 | Lupien et al. | |
| 6,055,517 A * | 4/2000 | Friend .......................... | 705/36 |
| 6,078,904 A | 6/2000 | Rebane | |
| 6,098,051 A | 8/2000 | Lupien et al. | |
| 6,188,992 B1 | 2/2001 | French | |
| 6,240,399 B1 | 5/2001 | Frank et al. | |
| 6,393,409 B1 * | 5/2002 | Young .......................... | 705/37 |
| 6,405,179 B1 | 6/2002 | Rebane | |
| 6,484,152 B1 | 11/2002 | Robinson | |
| 6,601,044 B1 | 7/2003 | Wallman | |
| 6,606,615 B1 | 8/2003 | Jennings et al. | |
| 2001/0034662 A1 | 10/2001 | Morris | |
| 2002/0013754 A1 | 1/2002 | Frank et al. | |
| 2002/0091605 A1 | 7/2002 | Labe, Jr. et al. | |
| 2003/0088492 A1 | 5/2003 | Damschroder | |
| 2003/0233304 A1 | 12/2003 | Dhurandhar et al. | |

FOREIGN PATENT DOCUMENTS

| | | |
|---|---|---|
| WO | WO 96/18162 | 6/1996 |
| WO | WO 98/44443 | 10/1998 |
| WO | WO 98/44444 | 10/1998 |
| WO | WO 00/38094 | 6/2000 |
| WO | WO 00/39734 | 7/2000 |

(Continued)

OTHER PUBLICATIONS

Pacheco et al: "Cash Flow Planning and Optimization through genetic algorithms"; ICA, Rio de Janerio; 6 pages; NO DATE.*

(Continued)

Primary Examiner—Alain L. Bashore
(74) Attorney, Agent, or Firm—Fenwick & West LLP

(57) ABSTRACT

A genetic algorithm determines a plan for payment of payment obligations in accounts payable of a finance account. The genetic algorithm operates to satisfy certain objectives, including maximizing the minimum daily cash on hand in the finance account. A genome population including a number of vectors is generated. The genome population is modified using a genetic algorithm, until at least one vector represents a plan for the payment obligations such that payment of each payment obligation in accordance with the vector most nearly satisfies one or more objectives.

17 Claims, 5 Drawing Sheets

FOREIGN PATENT DOCUMENTS

| | | | |
|---|---|---|---|
| 2004/0030622 | A1 * | 2/2004 | Ramos et al. ............ 705/35 |
| 2004/0128219 | A1 | 7/2004 | Hilton |
| WO | WO 03/017683 A2 | 2/2003 | |
| WO | WO 03/079150 A2 | 9/2003 | |

OTHER PUBLICATIONS

Cacho, Oscar et al., "A Genetic Algorithm Approach To Farm Investment," The Australian Journal of Agricultural and Resource Economics (Sep. 1999), vol. 43, Issue 3, pp. 305-322.

Chen, Shu-Heng et al., "Option Pricing with Genetic Algorithms: The Case of European-Style Options," Proceedings of the Seventh International Conference on Genetic Algorithms, Michigan State University (Jul. 19-23, 1997), pp. 704-711.

Gilli, Manfred et al., "Heuristic Approaches for Portfolio Optimization," Computing in Economics and Finance 2000 [online], Jul. 5, 2000, [retrieved on May 30, 2002]. Retrieved from the Internet: <URL: http/fmwww.bc.edu/cef00/papers/paper289.pdf>.

Kallel, Leila et al., "Alternative Random Initialization in Genetic Algorithms," Proceedings of the Seventh International Conference on Genetic Algorithms, Michigan State University (Jul. 19-23, 1997), pp. 268-275.

Mansini, Renata et al., "Heuristic Algorithms for the Portfolio Selection Problem With Minimum Transaction Lots," European Journal of Operational Research 114 (1999), pp. 219-233.

Mehta, Kumar et al., "Combined Rules Learnt Using Genetic Algorithms for Financial Forecasting," Proceedings of the Congress on Evolutionary Computation (CEC), Washington D.C. [online], Jun. 1999 [retrieved on May 30, 2002]. Retrieved from the Internet: <ULR: http://icarus.cc.uic.edu/~kmehta1/CEC99.pdf>.

Neuneier, Ralph, "Optimal Asset Allocation Using Adaptive Dynamic Programming," Advances in Neural Information Processing Systems (1996), vol. 8, pp. 952-958.

Noe, Thomas H. et al. "Corporate Financing: An Artificial Agent-Based Analysis," source unknown (Mar. 2000), pp. 1-47.

Pacheco, Marco Aurélio et al., "Cash Flow Planning and Optimization Through Genetic Algorithms," Computing in Economics and Finance 2000, Society for Computational Economics (2000) No. 333.

Sakanashi, Hidenori et al., "Adaptive Attention Control in Genetic Algorithm," IPSJ Journal Abstract, vol. 38 No. 07-001 [online], May 24, 2001 [retrieved on Nov. 5, 2002]. Retrieved from the Internet: <ULR: http://www.ipsj.or.jp/members//Journal/Eng/3807/article001.htm>.

Tsutsui, Shigeyoshi et al., "A Real Coded Genetic Algorithm with an Explorer and an Exploiter Populations," Proceedings of the Seventh International Conference on Genetic Algorithms, Michigan State University (Jul. 19-23, 1997), pp. 238-245.

Wall, Matthew, "Overview of Genetic Algorithms," MIT Mechanical Engineering Department presentation on Introduction to Genetic Algorithms [online], date unknown [retrieved on Nov. 8, 2001]. Retrieved from the Internet: <ULR: http://lancet.mit.edu/~mbwall/presentations/IntroToGAs/P001.html>.

Alander, Jarmo T., "An indexed Bibliography of Genetic Algorithms in Economics," drafted May 18, 2000, Department of Information Technology and Production Economics, University of Vaasa, Report Series No. 94-1-ECO.

Bao, Paul et al, "A Hybrid Portfolio Theory Model Based on Genetic Algorithm and Vector Quantization," Oct. 1998, 1998 Proceedings of IEEE Conference on Systems, Man and Cybernetics, San Diego, California, pp. 4301-4306.

Bedau, Mark A., et al, "Visualizing Waves of Evolutionary Activity of Alleles," Jul. 13, 1999, Proceedings of the 1999 Genetic and Evolutionary Computation Conference Workshop Program, Orlando, Florida, pp. 96-98.

Butler, James M., et al, "EDDIE Beats the Bookies," Dec. 15, 1995, Wiley InterScience Software—Practice & Experience, vol. 28, Issue 10 (Aug. 1998), pp. 1033-1043.

Chan, Man-Chung et al, "Genetic Algorithms in Multi-Stage Asset Allocation System," Oct. 2002, 2002 Proceedings of IEEE International Conference on System, Man and Cybernetics, vol. 3, pp. 316-321.

Chen, Shu-Heng, "Evolutionary Computation in Financial Engineering: A Roadmap of GAs and GP," date unknown, Financial Engineering News, vol. 2, No. 4 (Sep. 1998), 10 pages.

Chen, Shu-Heng, "On the Relevance of Genetic Programming to Evolutionary Economics," 2001, Evolutionary Controversy in Economics Towards a New Method in Preference of Trans Discipline, Springer-Verlag, Tokyo, pp. 135-150.

Dempster, M. et al, "A Real-Time Adaptive Trading System Using Genetic Programming," 2001, Quantitative Finance vol. 1, Institute of Physics Publishing, pp. 397-413.

Dhar, Vasant et al, Abstract of "Data Mining and Knowledge Discovery" (online), Oct. 2000, Kluwer Journals.

Dunis, Christian L. et al, Abstract of "Forecasting and Trading Currently Volatility: An Application of Recurrent Neural Regression and Model Combination" (online), Jun. 2002, Wiley InterScience Journal of Forecasting.

Foster, James A. et al, "Portfolio Selection with Genetic Algorithms," Apr. 4, 1996, University of Idaho, Department of Computer Science Laboratory for Applied Logic, 13 pages.

Frick, Andreas, et al, "A Genetic-Based Approach for the Derivation of Trading Strategies on the German Stock Market," 1996, Proceedings of 3$^{rd}$ International Conference on Neural Information Processing, Hong Kong (Sep. 24-27, 1996), pp. 776-770.

Frick, Andreas, et al, "Genetic-Based Trading Rules—A New Tool to Beat the Market With?," 1996, Proceedings of 6$^{th}$ International AFIR Colloquium, Nürnberg (Oct. 1-3, 1996), vol. I/II, pp. 997-1018.

IBA, Hitoshi et al., "Using Genetic Programming to Predict Financial Data," Sep. 1999, Proceedings of the Congress on Evolutionary Computation, vol. 1, pp. 244-251.

Jiang, Rui et al, "Discovering Investment Strategies in Portfolio Management: A Genetic Algorithm Approach," Proceedings of the 9$^{th}$ International Conference on Neural Information Processing (Nov. 18-22, 2002), vol. 3, pp. 1206-1210.

Kai, Fu et al, "Training Neural Network with Genetic Algorithms for Forecasting the Stock Price Index," 1997, Proceedings of IEEE International Conference on Intelligent Processing Systems (Oct. 28-31, 1997), vol. 1, pp. 401-403.

Korczak, J. et al, Abstract of "Stock Timing Using Genetic Algorithms"(online), May 21, 2002, Wiley InterScience Applied Stochastic Models in Business and Industry (retrieved on Mar. 28, 2005).

Koza, John R., "Genetic Programming," Version 2 submitted Aug. 18, 1997, Encyclopedia of Computer Science and Technology.

Lam, Kin et al, Abstract of "Forecasting for the Generation of Trading Signals in Financial Markets" (online), Jan. 18, 2000, Wiley InterScience Journal of Forecasting.

Leinweber, David J., "The Perils and Promise of Evolutionary Computation on Wall Street" (online), 2003, Journal of Investing, vol. 12, No. 13.

Li, Jin et al, "Improving Technical Analysis Predictions: An Application of Genetic Programming," 1999, Proceedings, Florida Artificial Intelligence Research Symposium, Orlando, FL (1999), 13 pages.

Li, Jin et al, "Investment Decision Making Using FGP: A Case Study," 1999 IEEE Proceedings of the Congress on Evolutionary Computation, Washington, D.C. (Jul. 6-9, 1999), pp. 1253-1259.

Liao, Pen-Yang et al., "Dynamic Trading Strategy Learning Model Using Learning Classifier Systems," 2001, Proceedings of IEEE Congress on Evolutionary Computation, vol. 2, pp. 783-789.

Lin, Wen-Shiu et al., "A Study on Investment Decision Making Model: Genetic Algorithms Approach," 1999, Proceedings of IEEE International Conference on System, Man and Cybernetics (Oct. 12-15, 1999), vol. 1, pp. 1049-1054.

Mahfoud, Sam et al, "Financial Forecasting Using Genetic Algorithms," 1996, Journal of Applied Artificial Intelligence, vol. 10, No. 6, pp. 543-565.

Markose, Sheri et al., "Evolutionary Arbitrage for FTSE-100 Index Options and Futures," 2001, Proceedings of IEEE Congress on Evolutionary Computation, Seoul, So. Korea (May 27-20, 2001), vol. 1, pp. 275-282.

Nag, Ashok K. et al, Abstract of "Forecasting Daily Foreign Exchange Rates Using Genetically Optimized Neural Networks" (online), Jul. 12, 2002, Wiley InterScience Journal of Forecasting.

Neeley, Christopher, et al, "Is Technical Analysis in the Foreign Exchange Market Profitable? A Genetic Programming Approach," Dec. 1997, Journal of Financial and Quantitative Analysis, Working Paper 1996-006C for the Federal Reserve Bank of St. Louis.

O'Neill, Michael, et al, "Evolving Market Index Trading Rules Using Grammatical Evolution," 2001, In EvoWorkshops, pp. 343-352.

Orito, Yukiko et al, "Index Fund Portfolio Selection by Using GA," 2001, Proceedings of IEEE International Conference on Computational Intelligence and Multimedia Applications (Oct. 30 to Nov. 1, 2001), pp. 118-122.

Schlottmann, Frank et al, "A Hybrid Genetic-Quantitative Method for Risk-Return Optimization of Credit Portfolios," 2001, Proceedings of the Conference of Quantitative Methods in Finance, Sydney, Australia, p. 55 (27 pages).

Setzkorn, Christian et al, Evolving Rule-Based Trading Systems, 2002, Department of Computer Science, University of Liverpool, Technical Report ULCS 02-005.

Tang, Jing et al, "Grid Technology in Financial Planning—A Methodology for Portfolio Structuring," date and source unknown.

Tang, Wansheng et al., "Fractional Programming Model for Portfolio with Probability Criterion," 2002 Proceedings of IEEE International Conference on Systems, Man and Cybernetics (Oct. 6-9, 2002), vol. 6, 4 pages.

Vacca, Luigi et al, "Managing Options Risk with Genetic Algorithms," Jan. 30, 1997, Proceedings of IEEE/IAFE Computational Intelligence in Finance Engineering Conference (Mar. 1997), New York, pp. 29-35.

Wang, Jun, Abstract of "Trading and Hedging in S&P 500 Spot and Futures Markets Using Genetic Programming" (online), Nov. 2, 2000, Wiley InterScience Journal of Forecasting.

"List Technical Trading Articles," date and source unknown, 7 pages.

* cited by examiner

CASH FLOW OPTIMIZATION USING A GENETIC ALGORITHM

TECHNICAL FIELD

The present invention relates generally to cash flow optimization and, more specifically, to using genetic algorithms to optimize cash flow in terms of maximizing the minimum daily cash on hand in a finance account while optimizing one or more objectives.

BACKGROUND OF THE INVENTION

Cash flows in and out of a business or household, since every business or household has a set of accounts receivables and a set of accounts payables as well as assets. Business and households are very interested in the amount of cash readily available on a daily basis. Thus, business and households typically keep track of the amount of cash on hand (hereinafter, "COH") on a daily basis, where cash on hand for a given day is defined as follows:

Cash On Hand (COH)=Initial COH (COH of Previous Day)−Cash Payable (CP) for the Given Day+Cash Receivable (CR) for the Given Day.

Businesses are particularly interested in keeping the minimum daily COH above a certain threshold, since most businesses have to keep a certain daily balance of cash due to bank account requirements, legal requirements, accounting requirements, and the like and also for avoiding being too close to insolvency.

FIG. 1 illustrates an example of how the COH of a company fluctuates on a daily basis and an example of a minimum threshold of $15,000 above which the daily COH should be maintained. A company may have accounts receivable of $15,000, $20,000, $25,000, $ 10,000, $15,000, $20,000, $5,000, $20,000, and $5,000 to receive on January 1, January 2, January 3, January 4, January 5, January 6, January 7, January 8, and January 9, respectively. In addition, the company may also have accounts payable of $10,000, $10, 000, $45,000, $5,000, $25,000, $5,000 $0, $15,000, and $5,000 on January 1, January 2, January 3, January 4, January 5, January 6, January 7, January 8, and January 9, respectively. In this example, the company's COH will change by +$5,000, +$10,000, −$20,000, +$5,000, −$10,000, +$15,000, +$5,000, +$5,000, and $0, on January 1, January 2, January 3, January 4, January 5, January 6, January 7, January 8, and January 9, respectively. Accordingly, if the COH on December 31 of the previous year was $30,000, the daily COH of the company will fluctuate as shown in FIG. 1.

Referring to FIG. 1, the daily COH on January 5 was at its lowest ($20,000) among the days in the considered period of time. This $20,000 amount is referred to as the minimum daily COH for the given period. As stated above, businesses are very interested in maintaining the minimum daily COH above a certain threshold, such as $15,000, as an example shown in FIG. 1.

The daily COH for a given period may vary depending upon the manner in which particular payments are made or received. Many accounts payable and receivable have an amount to pay, a due date, certain penalties incurred for late payment, minimum required payment, and the like. Businesses may not be able to control the accounts receivable, since the accounts receivable depends upon the manner in which payments are received from other businesses. However, one or more of these elements of accounts payable may be utilized to control the minimum daily COH. For example, businesses may decide to make a certain payment earlier than the due date if there are certain benefits associated with early payments, such as a discount of the payment amount. As another example, early payments prior to the fiscal year end may reduce income taxes for the fiscal year. Businesses may also decide to make a certain payment later than the due date notwithstanding the penalties associated with late payments in order to prevent the COH from falling below the minimum threshold on a given day. Businesses also may prefer lumping more than one payment to a single payee (vendor) together to minimize the number of check runs, or may also prefer separating the payments for ease of identification and accounting.

Therefore, companies should, but typically do not, consider various factors (or objectives) in deciding when and how much of a payment to be make on a given day, such as maximizing the minimum daily cash on hand, minimizing or maximizing late payment penalties, tax impacts or tax deductibility, number of check runs, number of check runs per vendor, rewards or favorable terms given for early or full payments, postage fees incurred in mailing the payments, subjective importance or regret of each payment, and the like. A very efficient cash flow plan (a plan dictating when and how much of the payment obligations of the accounts payable should be satisfied) taking into consideration all of these objectives in an optimized manner could result in savings of a significant amount of money for the businesses.

It is a very complicated task to find a solution for an efficient cash flow plan while optimizing these various factors. Consider, for example, a highly simplified situation where the accounts payable includes 100 different payment obligations of $100 due on 10 different dates within 30 days. The search space for this situation would involve devising a plan to pay all or some part of each payment obligation on a certain date within the 30 day period while satisfying the above-mentioned factors objectives. Assuming that payments can be made in $1 increments between $0 and $100, just to simplify the calculation, there will be 100 ways to make a payment for each payment obligation. This means that there will be 100 ways to make payments on 100 payment obligations on any one of 30 days, resulting in $100^{100 \times 30}$ combinations of possible solutions, clearly too many to be each individually considered even on the most powerful computers in existence. In addition, a variety of the above-mentioned objectives should be considered when finding the solution, such as maximizing the minimum daily COH while optimizing the other objectives such as minimizing late payment penalties, minimizing tax obligations or maximizing tax deductions, minimizing the number of check runs, minimizing the number of check runs per vendor, maximizing rewards or favorable terms given for early or full payments, minimizing postage fees incurred in mailing the payments, and maximizing subjective importance or minimizing regret for each payment, and the like with respect to a user-specified importance level for each objective. The solution space for such a situation will be enormous, discontinuous in scope and will typically involve non-linear, non-dimensional, and inter-dependent variables.

Such a complicated problem is very difficult to solve, but once a solution is obtained, it is easy to evaluate the solution. Such problems are called non-deterministic polynomial ("NP") problems, which mean that it is possible to guess the solution by some non-deterministic algorithm and then check the solution, both in polynomial time. Generally, NP problems may be solved by genetic algorithms. However, so far there has been no attempt to apply a genetic algorithm to finding a solution for optimizing cash flow while optimizing certain objectives of a user.

SUMMARY OF INVENTION

The present invention solves this problem by generating a plan for making payments of payment obligations in accounts payable of a given finance account by using a genetic algorithm, while satisfying or optimizing certain objectives, including, but not limited to maximizing the minimum daily cash on hand.

In one embodiment, a genome population including a number of genomes is generated. Each genome has a plurality of alleles representing a payment date and a fractional (perecentage) payment amount corresponding to each payment obligation in the accounts payable. For example, if a payment of $50 is due to a payee on Mar. 3, 2003, then the allele of the genome corresponding to this payment could represent −10 and 0.25 as the date offset and factional payment amount, respectfully, which would mean paying 25% or $12.50, 10 days early on Feb. 21, 2003. Thus, a single genome may be understood to represent a cash flow plan, since it has a plurality of alleles defining the payment schedule for a number of accounts payable. Each genome is represented by a vector, list or other useful data structure.

The genome population is evaluated with respect to various objective functions. The objective functions provide a way of measuring the degree to which the payment of payment obligations in accordance with a genome vector satisfies one or more objectives. For example, the genomes can be evaluated with respect to resulting cash on hand, tax savings, amount of penalty fees, number of checks printed, number of check runs, and other objectives that are of interest to the business.

The genome population is modified using a genetic algorithm, including introducing into the genome population new genomes (vectors) derived from other genomes (vectors), including the original or previously existing genomes (vectors). In the context of the present invention the terms "vector" and "genome" will be used interchangeably herein, but no limitation of genomes to a vector form of representation is intended. Various vectors which best match the desired criteria in each generation are selected as mating vectors from the first set of vectors based on their fitness, and then combined to obtain a second set of vectors, which are the offspring of the mating vectors. The resulting offspring vectors are preferably mutated, and used to replace selected ones of vectors in the genome population. The genome population is modified in this way until at least one vector represents a cash flow plan for making payments of the payment obligations such that payment of the payment obligations in accordance with the vector most nearly satisfies or optimizes the objectives, such as maximizing the minimum daily cash on hand, minimizing late payment fees, and the like.

The present invention may be embodied in various forms, including computer program products, methods, and systems, special or general purpose computing devices or apparatuses, online services or systems, user interfaces, etc.

By employing a genetic algorithm in order to find a solution for optimizing a set of criteria, such as maximizing the minimum daily cash on hand, in the payment of payment obligations of the accounts payable, it is possible to search a potentially intractable solution space for an optimal solution in an acceptable amount of time.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

Figure 1:
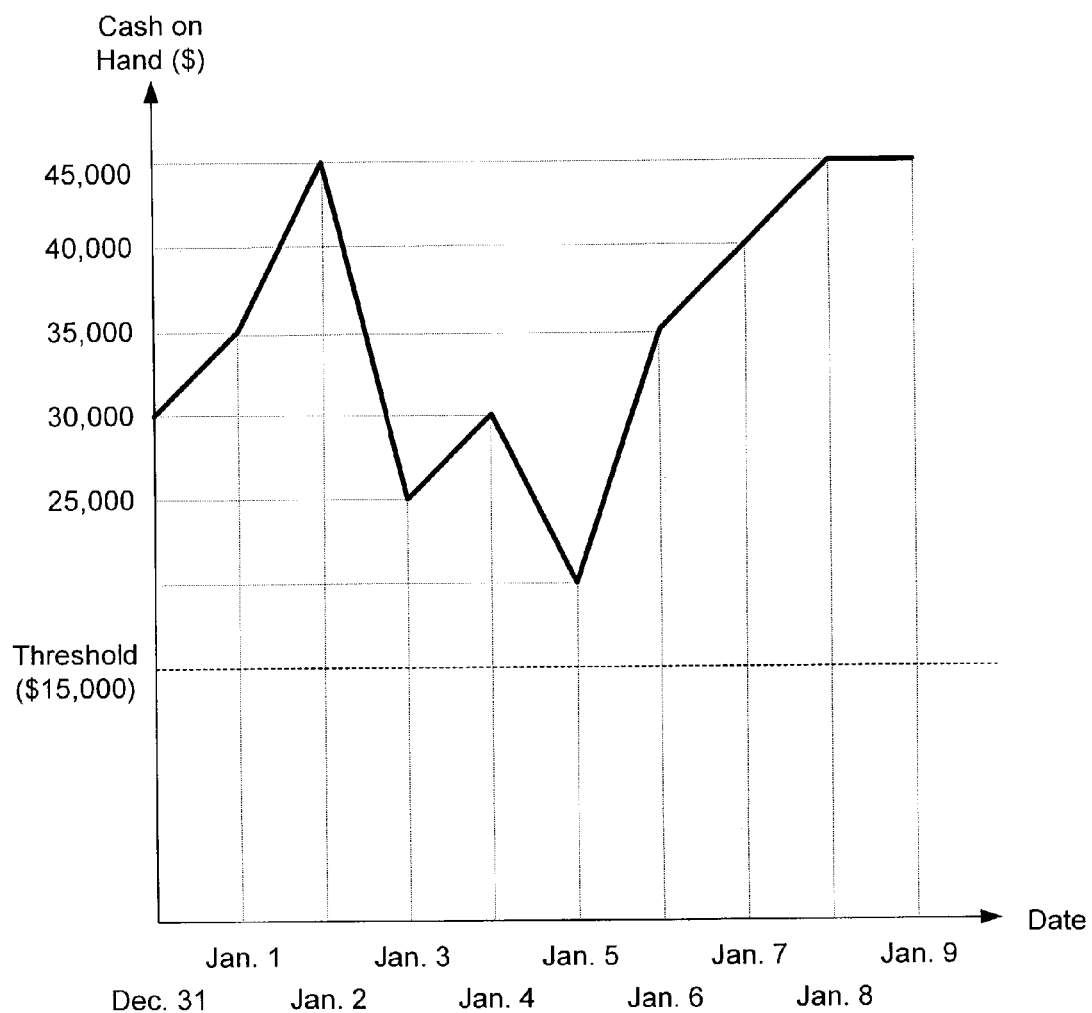
FIG. 1 is a graph illustrating an example of how the cash on hand of a business fluctuates on a daily basis.
Figure 2:
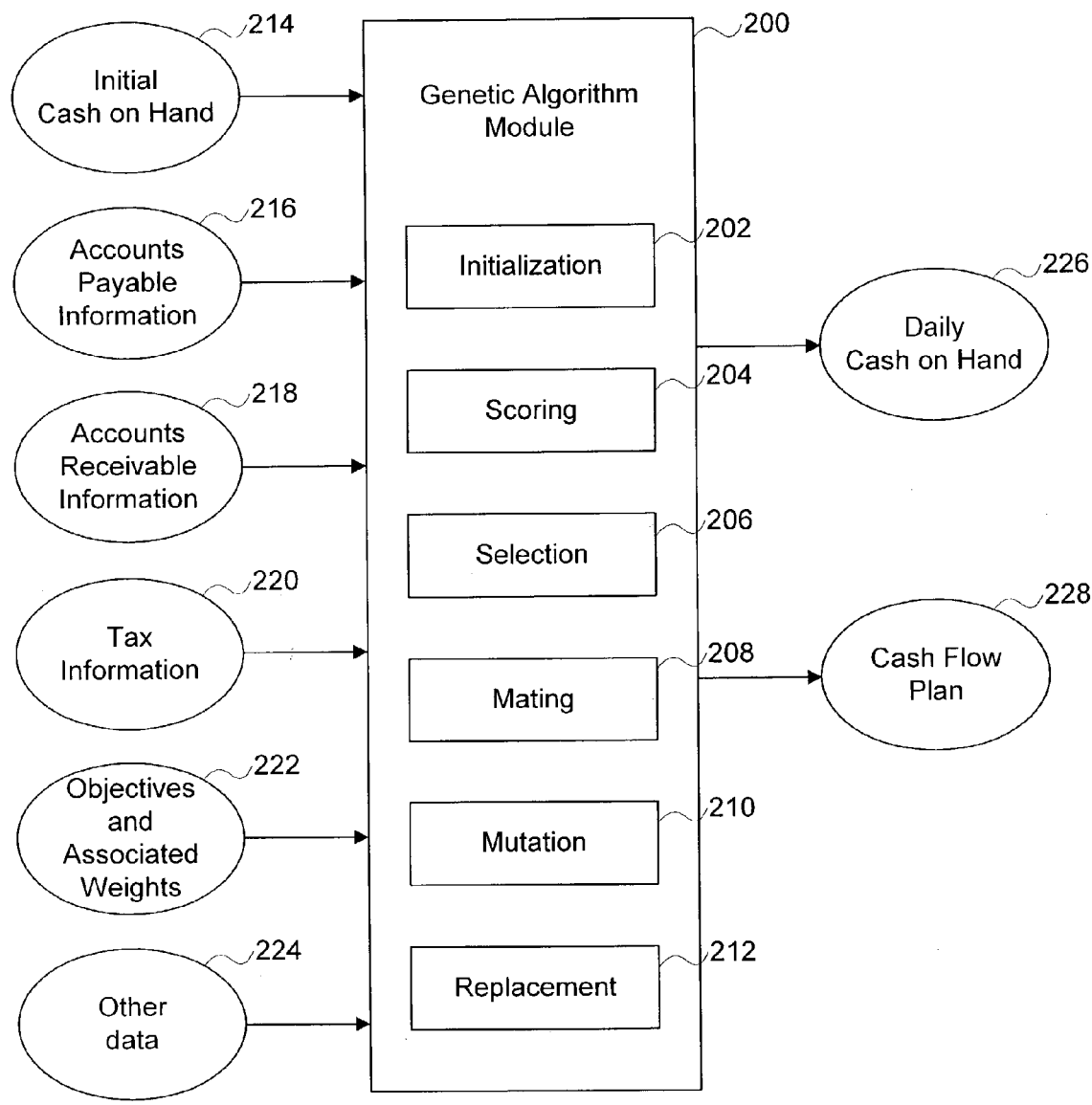
FIG. 2 illustrates the cash flow optimization system according to an embodiment of the present invention.

FIG. 2 illustrates the software architecture of a cash flow optimization system in accordance with one embodiment of the present invention. A genetic algorithm module 200 searches for an optimal cash flow plan that satisfies a number of objectives, including maximizing the minimum daily COH as well as other objectives that are of interest to the business, and which generally impact the costs, timing, or efforts made in making payments to vendors. The genetic algorithm module 200 uses as its input data an initial cash on hand (cash balance) 214, accounts payable information 216, accounts receivable information 218, tax information 220, a plurality of objectives and associated weights 222, and any other type of relevant data 224. Each of these sources of information is stored in appropriate local or remote databases or data storages. Based upon such input data, the genetic algorithm module 200 outputs a cash flow plan 228 describing when and how much (percentage) of the payment obligations for a group of selected accounts payable should be paid while additionally satisfying a plurality of objectives, and a resultant cash on hand 226 on a daily basis.

The initial COH 214 is the amount of cash on hand available (actual or hypothetical) immediately prior to when the genetic algorithm module 200 is used. In one embodiment, a user of the genetic algorithm module 200 manually inputs the initial COH 214. In another embodiment, the initial COH 214 is retrieved from a conventional relational or flat file database that is accessible to the genetic algorithm module 200. For example, many personal or business finance software applications, such as Intuit Inc.'s QuickBooks® and Quicken®, or Microsoft Corp.'s Money® use databases to store data pertaining to the user's cash balance. The COH may also be obtained, either manually or automatically, from the business's banking, such as through an online banking program. It is anticipated that the present invention in its embodiment as the genetic algorithm module 200 may be integrated into a business or personal finance software application, such as one of the foregoing applications.

The accounts payable information 216 includes a payment table having information relating to each of the payment obligations therein, such as payment due date, payment amount, payee (vendor) information, and late fees or penalties associated with the payment obligations in the accounts payable. The accounts payable information 216 also includes an account table having one or more accounts each corresponding to a billing matter and associated with one or more entries in the payment table. The accounts payable information 216 also includes a vendor table having one or more vendors each associated with one or more entries in the account table. The accounts payable information 216 may be provided manually by a user, or it may be obtained automatically by the genetic algorithm module 200 via appropriate connections with databases stored in personal or business finance application software or online information sources.

The manner in which the accounts payable information can be stored, and manner in which the genetic algorithm module 200 retrieves such information from external databases or online information sources is well understood by those of skill in the art. In one embodiment, the module 200 is integrated into a financial management application, an accounting application that stores the accounting information in a local or remotely accessible database; in this case, the module 200 has direct programmatic access to the accounts payable information 216. In another embodiment where the module 200 is independent of an accounting package, then it can obtain access to the accounts payable information 200 through an application programming interface, or even simple data importation. The particular details of how the accounts payable information 216 is obtained are not material to the operation of the invention.

The accounts receivable information 218 includes a receivables table having information regarding the due date, the amount of payments to receive, the payer, late fees or penalties associated with late payments, and the like. The accounts receivable information 218 may also be provided manually by a user, or it may be obtained automatically by the genetic algorithm module 200 via appropriate connections with databases stored in personal or business finance application software or online information sources. As with the accounts payable information 216, the manner in which the genetic algorithm module 200 retrieves such accounts receivable information 218 from external databases or online information sources is well understood by those of skill in the art, and the details are not material to the invention.

The tax information 220 includes relevant federal and state tax law information in the U.S. and tax law information of foreign countries to the extent they are relevant to the COH 226 and the cash flow plan 228 discussed herein. The tax information 220 includes the type of payments that are tax deductible, the maximum deduction amount, income tax rates, and the like. The tax information 220 may be stored as a set of tax rules, schedules, and associated tax computations, and may be manually or automatically provided.

The objectives 222 comprise the constraints that the genetic algorithm module 200 takes into consideration and attempts to optimize as it finds a solution for generating the cash flow plan 228. Those objectives 222 include, but are not limited to, minimizing late payment penalties, minimizing tax obligations or maximizing tax deductions, minimizing the number of check runs, minimizing the number of check sent to vendor, minimizing postage fees incurred in mailing the payments, and maximizing payments to important vendors or minimizing 'regret' for payments not made. Certain objectives 222 can be defined with respect to the COH. One of these objectives 222 is maximizing the minimum daily COH 226; a second related object is maintaining the minimum daily COH above a predetermined threshold. In addition, each objective 222 is associated with a weight that describes the level of importance of the objective 222. The weight may be fixed or it may be provided by the user. The weight is applied to one or more objective functions that relate to the particular objective. Any other relevant data 224, such as potage or courier fee data, may be input as well, so long as it can be used to modify or adjust the operation of the objective functions, their input parameters, or the genetic algorithm module 200.

In one embodiment, the genetic algorithm module 200 comprises an initialization module 202, a scoring module 204, a selection module 206, a mating module 208, a mutation module 210, and a replacement module 212. The specific details of one implementation of these software modules will be explained below in conjunction with FIGS. 3 and 4. The genetic algorithm module 200 finds a solution for maximizing the minimum daily COH 226 while optimizing the other objectives 222 and outputs the COH 226 on a daily basis along with a cash flow plan 228 describing when and what fraction of the amount of payment should be made for each payment obligation in the accounts payable 216 in order to maximize the minimum daily COH 226 while also optimizing the other objectives 222. Payments of the accounts payable 216 in accordance with the cash flow plan 228 will result in maximizing the minimum daily COH 226 while optimizing the user's objectives 222 according to user-specified weights. In generating the cash flow plan 228, the genetic algorithm module 200 assumes that 100% of the accounts receivable 218 will be received on the due date, according to one embodiment of the present invention. In another embodiment, the genetic algorithm module 200 assumes that only a predetermined fraction (e.g., 93 percent) of the amounts in the accounts receivable will be paid. In still another embodiment, the user may specify that a certain fraction of the amounts in the accounts receivable will be paid.

Functional Model

Figure 3:
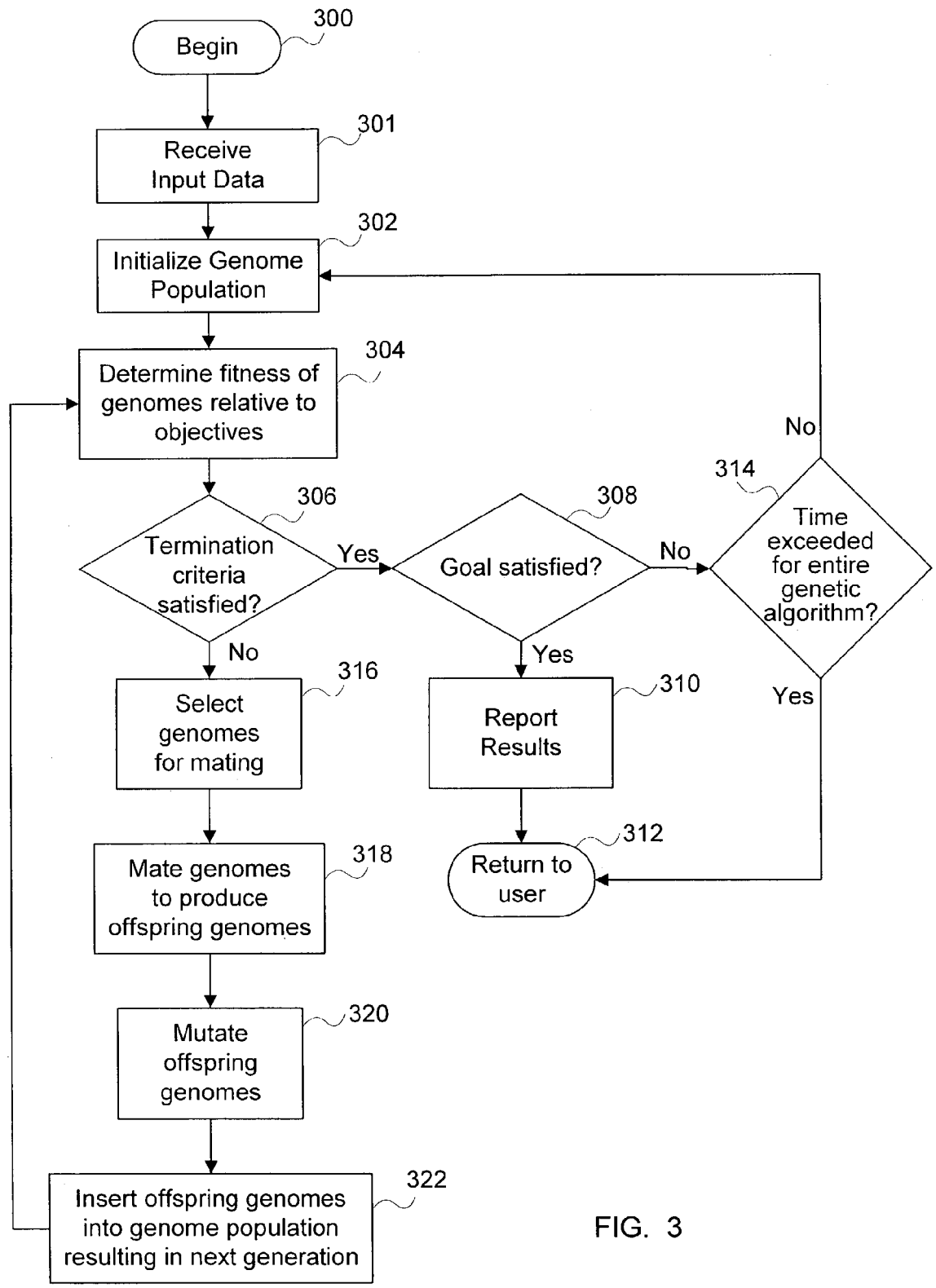
FIG. 3 is a flowchart illustrating the cash flow optimization genetic algorithm according to an embodiment of the present invention.
Figure 4:
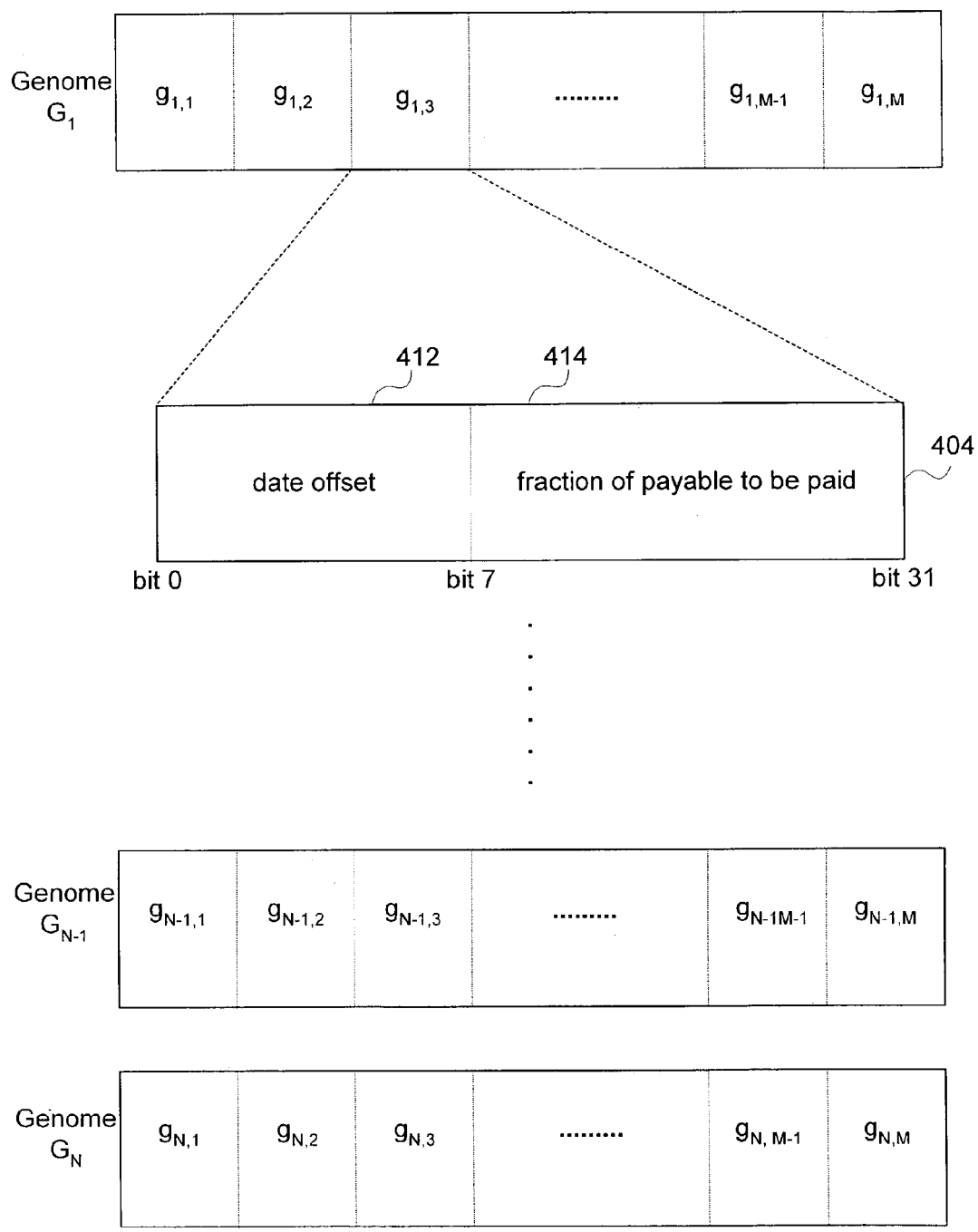
FIG. 4 is a diagram illustrating the genomes and alleles used in the cash flow optimization genetic algorithm according to an embodiment of the present invention.

FIG. 3 is a flowchart illustrating the overall operation of one embodiment of the cash flow optimization genetic algorithm module 200, and FIG. 4 is a diagram illustrating the genomes and alleles used in the cash flow optimization genetic algorithm according to an embodiment of the present invention. FIGS. 3 and 4 will be explained with additional reference to FIG. 2.

Referring to FIG. 3 and also FIG. 2, the operation begins 300 with the genetic algorithm module 200 receiving 301 input data such as the initial COH 214, accounts payable information 216, accounts receivable information 218, tax information 220, objectives and weights 222, and other relevant data 224. More specifically, and depending on the embodiment, the genetic algorithm module 200 retrieves the initial COH 214, accounts payable information 216, accounts receivable information 218, and tax information 220 from a database, such as a local database, or even a remote database, such as one maintained on the Internet by a financial services online provider, and stores the information locally. For obtaining the objectives and their weights 222, the genetic algorithm module 200 can provide the user with a graphical or textual user interface presenting each of the objectives and having the user rank order them in terms of importance, or use a sequence of pairwise comparisons to determine the user's implicit ranking, or provide the list of the objectives, along with a control for each to allow the user to set the weight (e.g., 1 to 10) of the objective, which are then internally normalized. In addition, the user can select which objectives 222 to satisfy and which to ignore (either by removing the objectives from the later computation process, or by giving such objectives a weighting of 0). Input of the initial COH 214 can likewise be made via a text or graphical user interface, when provided manually.

Initialization of Genome Population

Then, a genome population is initialized 302 by the initialization module 202. The genome population comprises a plurality of genomes. In the preferred embodiment, the genomes are in the form of vectors, though other data structures and implementations are certainly possible. An initial genome population of around 100 genomes is useful, but more or fewer can be used. In the context of the present invention the terms "vector" and "genome" will be used interchangeably herein, but no limitation of genomes to a vector form of representation is intended. Each genome comprises a plurality of "alleles" (otherwise referred to herein as "genes"), one allele for each payment obligation in the accounts payable 214. Each allele corresponds to a payment obligation in the accounts payable 214 and has information from which the amount of payment and the date of payment for the obligation can be derived. In a preferred embodiment, this information is encoded as a fractional (percentage) amount of the corresponding payment obligation to be made and a date offset (number of days before or after) the payment due date.

The genomes and the alleles will be explained in more detail with reference to FIG. 4. FIG. 4 shows N genomes $G_1, G_2, \ldots, G_N$ each of which has M alleles. For example, genome $G_1$ has alleles $g_{1,1}, g_{1,2}, g_{1,3}, \ldots, g_{1,M-1}$, and $g_{1,M}$. Likewise, genome $G_N$ has alleles $g_{N,1}, g_{N,2}, g_{N,3}, \ldots, g_{N,M-1}$, and $g_{N,M}$. The number of genomes N is determined so that the genetic algorithm of the present invention efficiently and thoroughly searches the solution space for an optimum cash flow plan 228. As stated above, the number of genomes N can be around 100. The number of alleles M in the genomes equals the number of payment obligations in the accounts payable 216 to be analyzed. In other words, each allele $g_{i,j}$ in one genome corresponds to one payment obligation in the accounts payable 216. This may be all outstanding accounts payable, or any subset selected by the user. For example, the user may select only payments due in the next 60 days.

Each allele in the genomes $G_1, G_2, \ldots, G_N$ represents a percentage of the amount of the payment obligation to be paid and the number of days before or after the payment due date on which the payment should be made. In one embodiment, an allele 404 is represented by a 32-bit value and includes a date offset 412 (8 bits), and a payment percentage 414 (24 bits). It should be clear to one of skill in the art that other number of bits for the allele 404, the date offset 412, and the payment fraction 414 may be used.

The date offset 412 represents the number of days before or after the due date of a payment obligation that a payment should be made. The date offset 412 is an unsigned integer with a maximum unsigned value of 255 ($2^8-1$). In implementation, for any date offset of an allele, ½ integer of this maximum value (i.e., 127) is subtracted from the data offset to generate a signed value representing the actual number of days before or after the due date of a payment obligation. For example, a date offset of "10000010" (i.e., 130) represents a payment date of 3 days after the due date (130−127=3). Likewise, a date offset of "01111101" (125) represents a payment date of 2 days prior to the actual due date (125−127=−2). Since the genetic algorithm module 200 has the accounts payable information 216 containing the actual due date of each payment obligation, such date offset maybe readily translated into an actual payment date. Representing the payment date by a date offset 412 rather than by an actual date requires fewer bits for representing a payment date.

Representing the payment date by a date offset 412 rather than by an actual date prevents or weakens the problem of epistasis in genetic algorithms. Epistasis refers to the problem of one allele or gene suppressing another allele or gene in genetic algorithms due to the dependence of the physical order of the alleles or genes on the problem at hand. By representing the payment date by an offset rather than an actual date, the alleles of the genomes of the present invention are one level removed from the actual physical order of the payment dates, and thus epistasis is less likely to occur. Using a date offset allows the genetic algorithm to fully "explore" the space of possible payment dates through random initialization, reproduction, and mating, without requiring any form of date verification, as would be the case with conventional date representation. The problem of epistasis and the advantage of using the date offset 412 to prevent epistasis may be clearly understood by the following example. Suppose a 32 bit word is used to store the actual payment date, allocating 4 bits for the month (which allows for not less than 12 months and up to 12 months), 5 bits for the day of the month (which allows for up to 32 days to be represented), and 12 bits for the year (allowing for the full year representation up to year 4096), for a total of 31 bits (with 1 unused bit). If this 32-bit word were evolved freely, invalid dates such as 13/32/2002 could be generated. Also dates very far into the future can be generated, which are far from optimal and retard the convergence of the genetic algorithm. This is a kind of local epistasis, i.e., bits within the allele affecting other bits within the allele. Global epistasis occurs in scheduling problems due to the optimality of "later" payments depending on the optimality of "earlier" payments. For example, if alleles 2−M in a genome are near optimal but allele 1 becomes optimal, allele 1 may invalidate the optimality of alleles 2−M by suddenly taking up all available COH to make a larger payment on time, resulting in the remaining M−1 payment obligations having no COH available and thus being late/unpayable. The global epistasis problem can be alleviated by randomizing the alleles at the beginning of the genetic algorithm. Employing an indirect scheduling time representation, as is done with the date offset of the present invention, further decouples interdependence between the allele space and time, providing a second level of indirection and additionally weakening the global epistasis inherent in the problem of cash flow optimization.

The payment percentage 414 is used to represent the percentage of the amount of the corresponding payment obligation to be paid, ranging from 0% to 100%. There are many different ways in which this value can be represented in the allele. In one embodiment, the allele stores an unsigned integer that represents the numerator of a quotient equaling the percentage, with the implicit denominator being the maximum unsigned integer that can be stored in a certain number of bits used for the percentage 414 of the payable amount to be paid. Therefore, the resultant quotient will be a number in the range of 0.0 to 1.0 in floating point form, which represents the percentage of the corresponding payable to be paid. A very simple example will suffice: Assume that the maximum number of bits is 24 as shown in FIG. 4, in which case the implicit denominator is "111111111111111111111111" in binary form. Thus, a percentage 414 having a value "000000000000000000000000" in binary form ultimately represents "100000000000000000000000" divided by "111111111111111111111111" (approximately 50%), which corresponds to the percentage of the amount of the payment obligation to be paid. As this should make clear then, the actual value stored for the percentage 414 in the allele 404 does not necessarily have to be the actual percentage of the payable, but only a value from which the actual percentage an be calculated. The use of unsigned integers in the alleles 404 has an advantage that it also helps avoiding epistasis, which is the inherent problem in genetic algorithms whereby a particular way of genome representation inhibits a genetic algorithm from finding an optimum solution to a problem. By using the entire bit field to represent the space of possible numerators, the entire range of possible percentages between 0 and 100% can be most effectively explored by the genetic algorithm.

According to one embodiment, the genomes in the initial genome population are randomly generated. The genetic algorithm module 200 of the present invention utilizes a bit-string uniform procedure in randomly generating the genomes, by assigning 0 or 1 to each bit in a genome with equal probability. To this end, the genetic algorithm module 200 first chooses randomly a bit density d corresponding to each bit in the genome from a uniform distribution, wherein 0<=d<=1. Then, the genetic algorithm module 200 randomly sets each bit of each of the alleles 404 in a genome to one (1) with a probability of d corresponding to the bit. This will result in genomes evenly distributed in the binary space. It should be noted that this initialization is with respect to the entire genome treated as single bit string, and temporarily ignoring the separation of the individual alleles. Thus, for example, if each allele is represented by a 32-bit value, and there are 10 alleles, then the genome is treated as a 320-bit string during the initialization process. The values of each allele are then the values of each corresponding 32-bit word in the bit string.

Additionally, in accordance with another embodiment of the present invention, selected ones of the genomes in the initial genome population are initialized with predetermined values thereby giving structured data for the genetic algorithm module 200 to draw on. For example, including a genome of all zeros (0) and a genome of all ones (1) in the initial genome population will help the genetic algorithm module 200 to find solutions at the very ends of the solution space. Any number of other fixed genomes may be added to the initial population, though this is likely to affect the quality of the overall search of the solution space.

Determining Fitness of Genomes by Use of Objective Function

Thereafter, the fitness of the genomes in the genome population is determined 304 by the scoring module 204 to obtain a fitness score by using a composite objective function, respective objective functions and related objectives and weights 222. Determining the fitness of a genome is equivalent to determining how close the genome comes to optimizing or satisfying the specified objectives when the cash flow plan represented by the genome is applied to the accounts payable 216. The objectives themselves include maximizing the minimum daily COH 226.

According to one embodiment of the invention, the fitness scores of the genomes in the genome population are determined by (i) evaluating the genome in the genome population to determine the payments and dates corresponding to each payment obligation, and thus the results of each objective function $O_i$; (ii) obtaining a composite genome objective value $O_{comp}$ from the weighted combination of the objective functions, using the weights associated with each objective function; and (iii) computing a fitness score F for each genome by applying a fitness function to the composite genome objective value $O_{comp}$ corresponding to each genome. The fitness function will be illustrated in detail below.

The composite genome objective value $O_{comp}$ for each genome in the genome population is calculated by first applying the evaluated genome to the accounts payable 216, and using the respective objective functions, to compute the objective values $O_G$ for each underlying objective (COH, number of check runs, tax impact, postage fees, etc.). That is, for each objective, there is an objective function to which the cash flow plan defined by the genome is applied; the result of the each objective function is the objective value $O_G$. Then, the objective values $O_G$ from all of the objective functions are normalized and standardized to obtain normalized, standardized objective values $O_i$ for each underlying objective. Finally, the normalized, standardized objective values $O_i$ are weighted and summed by a composite objective function to obtain a composite genome objective value $O_{comp}$ corresponding to the evaluated genome.

As illustrated in detail below, the objective values $O_G$ for each underlying objective may be calculated by applying the evaluated genome to the accounts payable 216 to assess the impact of the cash flow plan represented by the evaluated genome upon the various objectives. Each objective is associated with an objective value $O_G$. The best (optimum) and worst objective values $O_A$ and $O_Z$ corresponding to each underlying objective can also be calculated by analyzing the nature of the underlying objective.

Also as illustrated in detail below, the objective values $O_G$ for each underlying objective are normalized (to a value between 0 and 1) and standardized (optimal value is 0, worst value is 1) to generate normalized, standardized objective values $O_i$. Normalization and standardization of the objective values allow the different values/scales of each objective value corresponding to different objectives (e.g., maximizing the minimum daily COH, minimizing the number of check runs, minimizing postage fees, etc.) to be summed together, because they are now unitless relative values, not dollar values or other objective-specific values any more.

The normalization and standardization of the objective values $O_G$ may be done in a different manner for different objectives by analyzing the nature of the objectives. For most objectives, the normalized, standardized objective value $O_i$ can be computed by dividing the difference between the calculated objective value $O_G$ and the best (or desired) objective value $O_A$ by a normalization factor, which for most underlying objectives is the difference between the worst objective value $O_Z$ and the best objective value $O_A$, i.e., by the formula $O_i = |O_G - O_A|/|O_A - O_Z|$. However, the normalization factor can be different from $|O_A - O_Z|$ depending upon the type of objective to be optimized.

The following is an illustration of the manner in which $O_G$, $O_A$, $O_Z$ and $O_i$ are computed for a given genome in the genome population for various objectives in accordance with one embodiment of the present invention. These objectives listed below are merely exemplary, and can include other objectives that are not listed herein.

Calculating the normalized, standardized objective value $O_i$ for the objective of maximizing the minimum daily cash on hand: Here, $O_A$ is the minimum cash on hand that would be available if none of the payment obligations in the accounts payables 216 is paid, and $O_Z$ is the minimum cash on hand that would be available if all the payment obligations in the accounts payables 216 are paid immediately on an initial day when the genetic algorithm of the present invention is run. $O_A$ will be equal to the initial COH 214, since it is assumed that none of the payables are paid, and thus the COH is not reduced at all. The value $O_Z$ can be obtained by subtracting all the payable amounts in the accounts payable 216 from the initial COH 214.

$O_G$ is the minimum daily COH when the genome G is applied to the accounts payable 216 (i.e., after payments of certain payment obligations on certain dates according to the allele values of the genome). The minimum daily COH can be determined by:

(i) translating the payable parameters (the date offset 412 and the payment percentage 414) in each allele of the genome into an actual payment date and payment amount for the corresponding payment obligation in the accounts payable 216;

(ii) adjusting payment dates to business days (e.g., nearest date which is a Monday-Friday) and rounding up fractional payment amounts if payment obligations does not allow fractional payments;

(iii) ordering the payments by date, and determining the total payment for each day;

(iv) calculating and recording the daily COH for each day (daily COH for current day=COH of previous day−total payment amount for current day+total receivables amount for current day), resulting in a daily COH table indicating the daily COH amounts for each day; and (v) determining the minimum of the daily COH.

The initial COH 214, the accounts payable information 216, and the accounts payable information 218 are all input to the genetic algorithm module 200, so the minimum daily COH can be readily calculated as stated above. The normalized, standardized objective $O_i = |O_A - O_G|/|O_A - O_Z|$.

Calculating the normalized, standardized objective value $O_i$ for the underlying objective of minimizing late payment penalties: Here, $O_A$ is zero (no late payment penalties) and $O_Z$ is the sum of all late payment penalties associated with the payment obligations when all payment obligations are paid late. In another embodiment, $O_Z$ may be a sum of a predetermined late fee and a predetermined percentage of the total payable amount. As stated above, the late payment information is also part of the accounts payable information 216, so the genetic algorithm module 200 may readily calculate $O_Z$ based upon such information.

$O_G$ is the amount of late payment penalties to be paid when the evaluated genome is applied to the accounts payable 216. Each allele 404 in the evaluated genome is applied to each payment obligation in the accounts payable 216, and may incur a late payment fee if the payment date represented by the date offset 412 of the allele 404 is later than the due date depending upon the late payment penalties. The normalized, standardized objective value $O_i = |O_A - O_G|/|O_A - O_Z|$.

Calculating the normalized, standardized objective value $O_i$ for the objective of maximizing tax deduction: Here, $O_A$ is the maximum amount of tax deduction available when all the payment obligations in the accounts payable 216 are tax deductible, and $O_Z$ is zero (0) when none of the payment obligations in the accounts payable 216 is tax deductible. As explained previously, the appropriate tax law is input to the module as tax information 220. $O_G$ is obtained by applying the appropriate tax law to the cash flow plan 228 when the genome is applied to the accounts payable 216 to determine the amount that is tax deductible among the payments represented by the cash flow plan 228. The tax calculation can also be done by finance management applications such as Intuit Inc.'s QuickBooks® or Quickens® and Microsoft Corp.'s Money®. The normalized, standardized objective value $O_i = |O_A - O_G|/|O_A - O_Z|$.

Calculating the normalized, standardized objective value $O_i$ for the objective of minimizing the number of check runs: Larger number of check runs in a given period typically result in larger costs in a business due to overhead such as check issuance fees. Thus, businesses prefer to minimize the number of check runs in a given period. Here, $O_A$ is 0 (no check runs), and $O_Z$ is equal to the number of payment obligations in the accounts payable 216 (i.e., all payments are made in separate check runs). $O_G$ is obtained by counting the number of days on which any payment is made when the genome is applied to the accounts payable 216, since any payment on a given day would require a check run. For example, if after the payments are ordered by date, it turns out that all payments should be made on 5 different days, then $O_G$ is 5. The normalized, standardized objective value $O_i = |O_A - O_G|/|O_A - O_Z|$.

Calculating the normalized, standardized objective value $O_i$ for the objective of minimizing the number of checks per vendor: Consolidating payments to the same vendor may reduce overhead caused by check issuance fees. For example, a payment obligation to the same vendor on two different dates may be consolidated to one payment in order to reduce the number of check runs. Thus, businesses prefer to minimize the number of check runs per vendor. Here, $O_A$ is 0 (no check runs for the vendor), and $O_Z$ is equal to the number of payment obligations to a particular vendor (payee) in the accounts payable 216 (i.e., all payments to the particular vendor are made in separate payments).

$O_G$ is obtained by counting the number of days on which any payment is made to the particular vendor when the genome is applied to the accounts payable 216, since any payment to the particular vendor on a given day would require a check run. For example, if the genome represents that payments should be made on 3 different days to the particular vendor, then $O_G$ is 3. The normalized, standardized objective value $O_i = |O_A - O_G|/|O_A - O_Z|$. Since the accounts payable 216 may include more than one vendor and each vendor corresponds to a separate number of check runs per vendor, there may be a more than one normalized, standardized objective value $O_{i=|OA} - O_G|/|O_A - O_Z|$ corresponding to the objective of minimizing the number of check runs per vendor.

Calculating the normalized, standardized objective value $O_i$ for the objective of minimizing the total postage fee: Every mailing of a check would require a postage fee or any other type of delivery fee (such as courier fee). Urgent mailings of payments generally require a higher postage fee such as a courier fee. Therefore, businesses generally prefer mailing a payment well in advance of a payment due date. Thus, this objective prefers a payment plan that results in making payments sufficiently prior to their due date to avoid extra postage fees. Here, $O_A$ equals the amount of postage fees when all the payments in the accounts payable 216 are mailed using the lowest available postage, and $O_Z$ equals the amount of postage fees when all the payments in the accounts payable 216 are mailed using the most expensive postage (such as courier). $O_G$ is the amount of postage fee incurred when payments are made and mailed in accordance with the payment dates represented by the genome to be evaluated. Since the evaluated genome indicates the date of payment, it is possible to determine what type of postage is required for the payment to arrive prior to the payment due date when the payment is made on such date by using postage rate or courier fee information. The postage or courier fee information can be input to the genetic algorithm module 200 as other relevant data 224. The normalized, standardized objective value $O_i = |O_A - O_G|/|O_A - O_Z|$.

Calculating the normalized, standardized objective value $O_i$ for the objective of minimizing regret value: Regret value is a user-specified value assigned to each payment obligation in the accounts payable 216 and represents a degree of dislike for not fulfilling a certain payment obligation by the due date or in full. Businesses may have different business relations with different vendors, and thus would have different priorities in making payments to the vendors by the due date or in full. According to one embodiment of the present invention, the higher the regret value for a particular payment obligation is, the more disfavored the non-fulfillment of that payment obligation is, that is the more the user wishes to fulfill that payment obligation in full by the due date. Regret values can be input to the module 200 as one of the objectives 222, and are in the range of 0 to 1. Alternatively, each payment can be associated with a regret value, and stored in the under accounting information or database, such that this information can then be looked up when the genome is evaluated. $O_A$ is 0 (no regret) and $O_Z$ is 1 (total regret, most disfavored non-payment). $O_G$ is the average regret value for all the payment obligations that are not paid in full (i.e., payment percentage is less than 100%) or paid after the due date (i.e., date offset is positive) when the evaluated genome is applied to the accounts payable 216. $O_G$ is calculated by (i) adding all the regret values resulting from payments that are to be paid later than the payment due date or that are not paid in full according to the evaluated genome to obtain a total regret value and (ii) dividing the total regret value by the number of payment obligations in the accounts payable 216. The normalized, standardized objective value $O_i=|O_A-O_G|/|O_A-O_Z|$.

After the standardized, normalized objective values for the respective underlying objectives are calculated for the evaluated genome, the composite genome objective value $O_{comp}$ for the evaluated genome can be obtained by the following composite objective function:

$$O_{comp} = \sum_{i=1}^{n} w_i O_i$$

where $O_i$ is the normalized, standardized objective value for each objective;

$w_i$ is a weight for each objective; and n is the number of objectives to be optimized.

The weights are importance levels (either predetermined or specified by the user) in the range of 0 to 1 and are normalized so that they add up to 1. Each weight corresponds to an objective. Since the $O_i$'s are normalized and standardized values, a composite genome objective value $O_{comp}$ of zero (0) is the best (optimum) value and one (1) is the worst value.

In the manner described above, the composite genome objective values $O_{comp}$'s corresponding to each the genomes in the genome population are determined. Thereafter, the fitness score F for each genome in the genome population is obtained by applying a fitness function to each composite genome objective value $O_{comp}$. The fitness function is applied to the composite genome objective values in order to redistribute the genomes in the solution space such that the genomes are distributed in a way more effective for the genetic algorithm to explore. According to one embodiment of the present invention, the fitness score F for each genome in the genome population can be obtained by sigma truncation:

$$F = O_{comp} - (O_{average} - c * O_\sigma)$$

where $O_{comp}$ is the composite genome objective value for the genome;

$O_{average}$ is the average of the composite genome objective values $O_{comp}$'s corresponding to all of the genomes in the genome population;

c is a scaling factor, preferably equal to 2, according to one embodiment of the present invention; and $O_\sigma$ is the standard deviation of the composite genome objective values $O_{comp}$'s corresponding to all of the genomes in the genome population.

In this manner, the fitness scores F of all the genomes in the genome population can be determined. The fitness scores F of all the genomes are also in the range of 0 to 1. The use of a fitness function, although optional, ensures better alleles get an exponentially better change to propagate.

Termination Criteria

After the fitness scores of all the genomes in the genome population is calculated, it is determined 306 whether or not the termination criteria are satisfied. The termination criterion is one of two circumstances:

(i) at least one of the genomes in the genome population represents a cash flow plan 228 for the payment obligations in the accounts payable 216 such that the payment of the accounts payable 216 in accordance with the alleles in the genome most nearly optimizes the objectives 222 (including maximizing the minimum daily COH); or (ii) the number of generations (or alternatively amount of time) for modifying the genome population has exceeded a certain limit applicable to modifying one genome population.

The user of the genetic algorithm module 200 can specify how nearly the objectives should be optimized by the cash flow plan 228 represented by the genomes. For example, the user can specify a threshold amount for the minimum daily COH, and when the minimum daily COH generated by the genome exceeds the threshold amount, the termination criterion is satisfied. Alternatively, the user can specify a threshold fitness score, and when the fitness score of at least one of the genomes in the genome population is lower than the threshold fitness score, the termination criterion is satisfied.

The number of generations limit for one genome population as the termination criteria is preferably set as 300, such that the genetic algorithm terminates when the number of generations of one genome population exceeds 50. According to another embodiment, another termination condition is used in conjunction with the maximum number of generations. Here, after the number of generations exceeds the maximum, then it is determined whether or not the ratio of the best fitness score in the first generation F1 to the best fitness score in the current generation Fc is smaller than 1, i.e., F1/Fc<=1. If this ratio is smaller than or equal to 1, then the genetic algorithm is terminated because this means that the fitness score is not getting better (i.e., not getting lower) for further generations. If the ratio is larger than 1 (i.e., F1>Fc), then the genetic algorithm is not terminated because this means that the fitness score is getting better (i.e., getting lower) for further generations and it is worth trying the subsequent generations to find an optimum solution. In still another embodiment, after the number of generations exceeds the maximum, then it is determined whether or not the ratio of the $F_{c-max}/F_c<=1$, where $F_{c-max}$ is the fitness score of the c-max[th] generation, max is the maximum number of generations, and Fc is fitness score of the current generation. In such embodiment, only the latest max generations are reviewed. If this ratio is smaller than or equal to 1, then the genetic algorithm is terminated because this means that the fitness score is not getting better (i.e., not getting lower) for further generations. If the ratio is larger than 1 (i.e., $F_{c-max}>F_c$), then the genetic algorithm is not terminated because this means that the fitness score is getting better (i.e., getting lower) for further generations and it is worth trying the subsequent generations to find an optimum solution.

If one of the termination criteria is satisfied 306, the results are reported 310 and the process is returned 312 to the user, when the genetic algorithm module 200 has satisfied 308 the goal of optimizing the objectives (including maximizing the minimum daily COH). If the goal is not satisfied 308, then it is determined 314 whether or not the execution time applicable to the entire genetic algorithm of the application has exceeded a certain limit. If so, then the process is returned 312 to the user with the current best results. If not, the process returns to initialize 302 the genome population again and restarts the genetic algorithm. According to one embodiment, a user imposes this time limit for the entire genetic algorithm of the application. In another embodiment, this time limit is predetermined in the genetic algorithm module 200 itself. The results returned to the user may be displayed to the user by using any form of user interface, such as a graphical user interface, textual report, and the like.

Selection of Genomes for Mating

If the termination criteria are not satisfied 306, the selection module 206 in the genetic algorithm module 200 proceeds to select 316 genomes for mating. The selection can be carried out by roulette wheel selection, tournament selection, or any other type of selection method typically used by genetic algorithms.

According to one embodiment of the present invention, roulette wheel selection is used to give every genome in the genome population a chance of mating, the chance of mating for each genome being proportional to the determined fitness score of each genome. To this end, the fitness score $F_j$ for genome is used as a threshold and a random number R in the range of 0 to 1 is selected. The genome is selected for mating if $R>F_j$. Otherwise the genome is skipped. Because very good genomes will have very low $F_j$'s, R will more likely be greater than their fitness $F_j$. Very poor genomes are less likely to be picked since their fitness scores will be relatively higher. Roulette wheel selection is continued until the genetic algorithm module 200 has selected two mating genomes from the genome population.

According to another embodiment, tournament selection is used for selecting the mating genomes. Specifically, a first superior genome is selected from a first set of two randomly chosen genomes in the initial genome population. Then, a second superior genome is additionally selected from a second set of two randomly chosen genomes in the initial genome population. The first and second superior genomes are the selected genomes for mating. Superiority of each genome is determined based on the fitness score for each genome computed above. Tournament selection is continued until the genetic algorithm module 200 has selected two mating genomes from the genome population.

Mating Genomes to Create Offspring Genomes

Thereafter, the two selected genomes are mated 318 by the mating module 208 to create offspring genomes. According to one embodiment of the present invention, the selected genomes are mated by single-point crossover. Single-point crossover is performed by randomly selecting a common crossover point in a first mating genome and a second mating genome among the selected mating genomes. In one embodiment, the crossover point is at one of the boundaries of the alleles in the genome. The first mating genome has a first portion and a second portion divided by the common crossover point and the second mating genome also has a first portion and a second portion divided by the common crossover point. Then, the second portion of the first mating genome is replaced with the second portion of the second mating genome to create an offspring genome.

In another embodiment, two-point crossover is used for mating. Two-point crossover is performed by selecting two crossover points (here, boundaries of alleles), copying the part from the beginning of the genome to the first crossover point from the first mating genome, copying the part from the first to the second crossover point from the second mating genome, and copying the part from the second crossover point to the end of the genome from the first mating genome, so as to create an offspring genome. Two-point crossover has a higher crossover rate than single point crossover.

In still another embodiment, uniform crossover is used for mating. Uniform crossover is performed by randomly copying from either the first mating genome or the second mating genome to create an offspring genome. That is, the length of the genome is traversed and at each bit location a bit is copied into the offspring genome from either the first mating genome or the second mating genome, using a random selection function to select which parent genome's bit it copied into the offspring.

According to still another embodiment of the present invention, arithmetic crossover is used for mating. Arithmetic crossover is carried out by performing a certain arithmetic operation with the first and second mating genomes to create an offspring genome. For example, the first and second mating genomes represented can be added to obtain the offspring genome.

Mutating Offspring Genomes

Thereafter, the offspring genomes are mutated 320 at a low frequency by the mutation module 210. According to one embodiment of the present invention, the mutation rate is 0.01%, and this is implemented by selecting a single integer in the range of 1 to 10,000, and mutating only when a randomly selected number in the range equals the selected integer. Another approach is to set the mutation rate as the threshold itself, and mutate only if a randomly selected number is below the threshold. The low frequency mutation rate is selected such that it is high enough for the genetic algorithm to explore the solution space effectively but low enough to prevent destruction of information obtained during mating. Mutation is carried out by (i) selecting a bit in the offspring genome to mutate by random selection in a uniform distribution, and (ii) changing the selected bit in the offspring genome from zero (0) to one (1), or vice versa, according to the mutation rate. In another embodiment, mutation can also be carried out by (i) selecting a bit in the offspring genome to mutate by random selection in a uniform distribution, (ii) determining what value to change the selected bit also by random selection, and (iii) changing the selected bit according to the determined value.

Inserting Offspring Genomes into Genome Population

Thereafter, the offspring genomes are inserted 322 into the genome population and a new generation genome population is obtained based on a replacement strategy by the replacement module 212. In one embodiment, the replacement strategy adds the offspring genome to the initial genome population to obtain a modified genome population. Then, the fitness score of each genome in the modified genome population is determined in the manner described above. Thereafter, a first predetermined number or percentage of the worst vectors are removed from the modified genome population based upon the determined fitness of the modified genome population. Finally, a second predetermined number or percentage of the best vectors in the initial genome population are added to the modified genome population based upon the determined fitness of the initial genome population. For example, 25 worst/best vector maybe selected, or alternatively the 10% worst/best vectors. The resultant modified genome population is the new (next generation) genome population.

Then, the process returns to determine 304 the fitness of the new genome population as described above. The above process is repeated until the termination criteria are satisfied 306.

The genetic algorithm module 200 is able to search an enormous, non-linear search space with a number of interdependent variables to find a near optimal solution for optimizing or satisfying numerous objectives specified by the user. Numerous (possibly conflicting) objectives can be weighted by the importance levels and optimized at the same time. The objectives can include maximizing the minimum daily cash on hand. Moreover, the genetic algorithm module 200 is not limited to a certain type of payment and can be used with any type of payment obligations in the accounts payable 216. In addition, the solution can be found in an acceptable or interactive period of time, such as a few seconds to a few minutes.

It is also possible to use two or more of the genetic algorithm modules 200 at the same time in order to more efficiently find the optimum solution to the cash flow plan 228. One embodiment of the present invention uses two genetic algorithm modules 200, including an "exploiting" genetic algorithm and an "exploring" genetic algorithm. The exploiting genetic algorithm uses a mating method having a high crossover rate but will use a low mutation rate for mutation. This configuration allows this genetic algorithm to very effectively search the local space for better genomes. The exploring genetic algorithm uses a mating method having a low crossover rate but use a high mutation rate for mutation. This configuration allows the genetic algorithm to search over a very large amount of the entire solution space. If during any iteration, the exploring genetic algorithm finds a better solution than the exploiting genetic algorithm, the genome population in the exploring genetic algorithm is used to replace the genome population in the exploiting genetic algorithm and the exploring genetic algorithm is reinitialized. The population shift gives the exploiting genetic algorithm the 'better' population to search through, while the exploring genetic algorithm is redirected to evaluate a new portion of the solution space.

As a further refinement of this dual genetic algorithm approach, the relative amounts of processing time given to the exploring genetic algorithm and the exploiting genetic algorithm can be systematically varied. To begin with, the exploring genetic algorithm is given a majority portion of the available compute time, and the exploiting genetic algorithm is given a minority portion. As the number of iterations increases, the exploiting genetic algorithm is given progressively more time, and the exploring genetic algorithm is given progressively less; this change in processing time can be linear or non-linear. In this manner, the solution to the cash flow plan 228 optimizing the objectives 222 may be found in a more efficient manner, since the solution space is vigorously searched by the exploring genetic algorithm in the early stages of the process and then the solution is vigorously optimized by the exploiting genetic algorithm in the later stages of the process.

It is also possible to use multiple different genome populations as the initial genome populations and run them simultaneously according to the genetic algorithm, rather than use one initial genome population. For example, one embodiment of the present invention utilizes 10 genome populations in parallel. This would result in reduction of the time required for finding the solution but would also be a heavier computational burden on the computer that runs the genetic algorithm.

Figure 5:
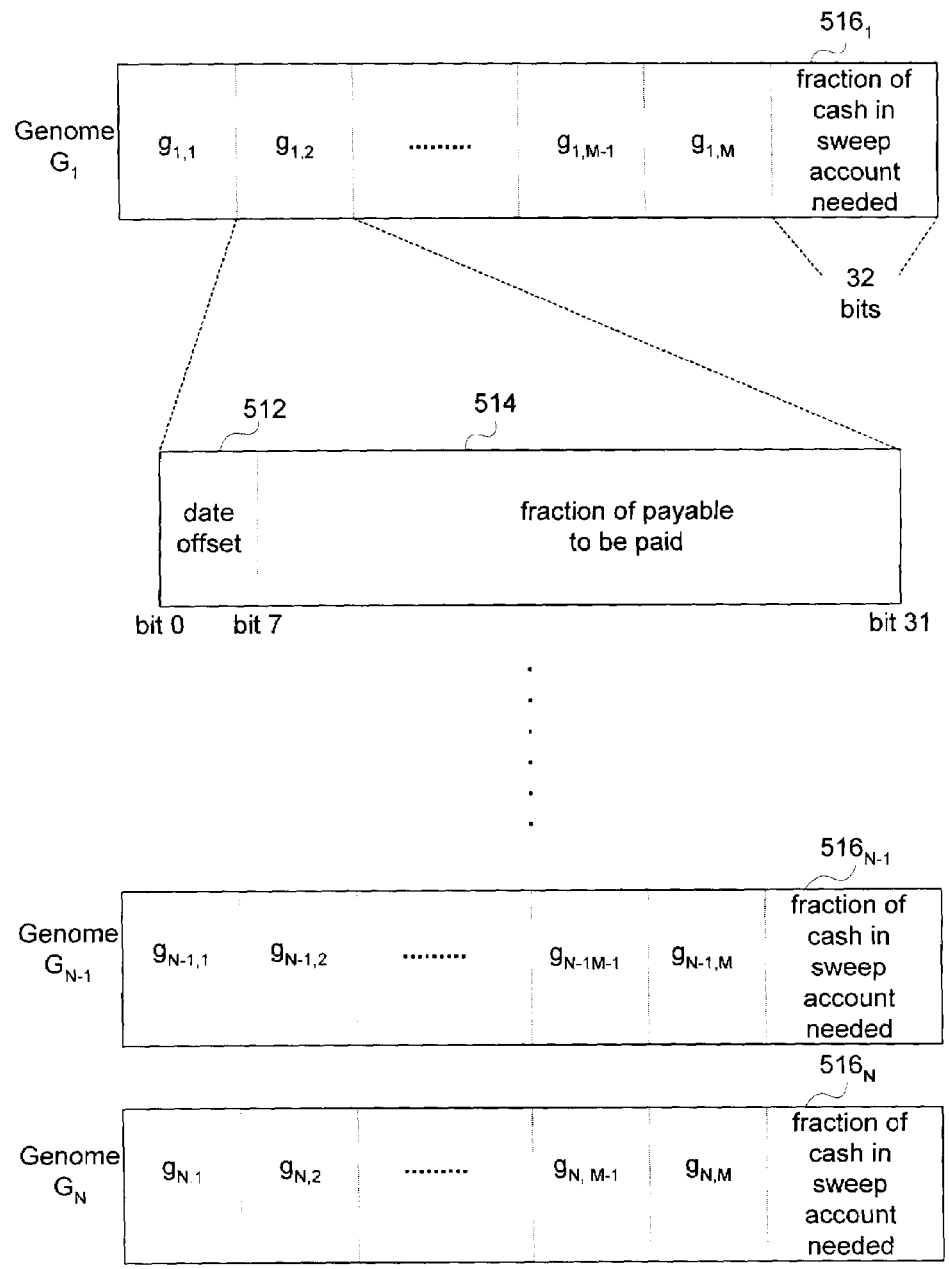
FIG. 5 is a diagram illustrating the genomes and alleles used in the cash flow optimization genetic algorithm according to another embodiment of the present invention.

FIG. 5 is a diagram illustrating the genomes and alleles used in the cash flow optimization genetic algorithm according to another embodiment of the present invention. Many businesses have more than one account in which they keep their available cash on hand. For example, a business may keep a primary checking account representing the initial COH and an interest-bearing savings account (i.e., a "sweep account") in which the bulk of the funds owned by the business are kept and from which funds are transferred (i.e., "swept") into the checking account on an as-needed basis. Such transfers or "sweeps" usually incur a transfer fee and results in funds leaving the interest bearing account, and thus businesses prefer to minimize such "sweeps." As such, in an alternative embodiment of the present invention, the objective of minimizing the amount of "sweep" from the "sweep account" is added as an objective 222. Information on the sweep account is input to the genetic algorithm module 200 as part of the initial COH 214. In addition, a modified form of genome reflecting the sweep account concept, as shown in FIG. 5, is used in conjunction with this alternative embodiment.

Referring to FIG. 5, N genomes $G_1, G_2, \ldots, G_N$, each of which has M+1 alleles, are shown. For example, genome $G_1$ has alleles $g_{1,1}, g_{1,2}, \ldots, g_{1,M-1}, g_{1,M}$, and an additional allele $516_1$. Likewise, genome $G_N$ has alleles $g_N, g_{N,2}, \ldots, g_{N,M-1}, g_{N,M}$, and an additional allele $516_N$. The genomes $G_1, G_2, \ldots, G_N$ in FIG. 5 are identical to the genomes described in FIG. 4, except that one additional allele ($516_1, 516_2, \ldots, 516_N$) is present in each genome $G_1, G_2, \ldots, G_N$. Each additional allele ($516_1, \ldots, 516_{N-1}, 516_N$) is comprised of 32 bits and represents a fraction (percentage) of the amount of cash in the sweep account that is needed in addition to the COH, in order to make payments according to the cash flow plan (payment plan) represented by the remaining M alleles in the evaluated genome. The additional allele ($516_1, 516_2, \ldots, 516_N$) stores an unsigned integer that represents the numerator of a quotient equaling such percentage, with the implicit denominator being the maximum unsigned integer that can be stored in the 32 bits used for the percentage 516 of the sweep account. Therefore, the resultant quotient will be a number in the range of 0.0 to 1.0 in floating point form, which represents the percentage of the cash in the sweep account.

With the modified genome of the alternative embodiment of the present invention, it is possible to optimize the objective of minimizing the percentage of cash in the sweep account needed in order to make payments according to the cash flow plan as represented by the remaining M alleles in the evaluated genome. The normalized, standardized objective value $O_I$ for the objective of minimizing the percentage of the cash in the sweep account need may be calculated as follows: Here, $O_A$ is 0% (none of the cash in the sweep account is needed), and $O_Z$ is 100% (all of the cash in the sweep account is needed to fulfill the cash flow plan represented by the remaining M alleles in the evaluated genome). $O_G$ is the percentage of the cash in the sweep account as represented by additional allele ($516_1$, $516_2$, ..., $516_N$). The normalized, standardized objective $O_t=|O_A-O_G|/|O_A-O_Z|$.

When the modified genome with the additional alleles ($516_1$, $516_2$, ..., or $516_N$) is used with the genetic algorithm of the present invention, the amount of cash in the sweep account, as represented by the additional allele ($516_1$, $516_2$, ..., or $516_N$), is added to the daily COH in the daily COH table calculated above to result in a modified COH table with modified COH values, and other objective values as described above are calculated using these modified COH values in the modified COH table. In this manner, the genetic algorithm module 200 of the present invention may generate a cash flow plan enabling the user to make daily cash payments exceeding the COH in the primary account while optimizing the objective of minimizing the amount of cash needed from the sweep account. Since the amount of cash available in the sweep account is input to the genetic algorithm module 200 as part of the initial cash on hand 214, the amount of cash represented by the additional allele ($516_1$, $516_2$, ..., or $516_N$) may be readily converted to a cash amount to be transferred from the sweep account.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

I claim:

1. A computer-implemented method of determining a cash flow plan corresponding to a plurality of payment obligations in accounts payable of a finance account while satisfying at least one objective, the computer-implemented method comprising:

generating a first set of computer data representing a genome population having a first set of vectors, each vector in the first set of vectors representing the cash flow plan, numerically defining a payment date and a payment amount corresponding to each payment obligation in the accounts payable;

obtaining a second set of computer data representing a plurality of objectives with respect to the cash flow plan, the objectives including maximizing a minimum daily cash on hand in the finance account and each objective associated with a weight indicating the importance of the objective; and modifying the first set of computer data representing the genome population by use of a genetic algorithm, including:

determining a fitness for each of the vectors in the genome population using objective values, the objective values determined by applying objective functions to the vectors, each objective value weighted by the corresponding weight; and introducing new vectors in the genome population derived from other vectors including the first set of vectors, until at least one of the vectors in the genome population represents the cash flow plan, such that payment of each payment obligation in the accounts payable in accordance with the cash flow plan maximizes the minimum daily cash on hand in the finance account while satisfying the objectives, wherein each vector in the first set of vectors comprises a plurality of alleles each including a plurality of bits, and generating a first set of computer data representing a genome population having a first set of vectors comprises:

randomly choosing a bit density d from a uniform distribution, wherein 0<=d<=1; and in each of the first set of vectors, randomly setting each bit of each allele to one with a probability of d.

2. A computer-implemented method of determining a cash flow plan corresponding to a plurality of payment obligations in accounts payable of a finance account while satisfying at least one objective, the computer-implemented method comprising:

generating a first set of computer data representing a genome population having a first set of vectors, each vector in the first set of vectors representing the cash flow plan, numerically defining a payment date and a payment amount corresponding to each payment obligation in the accounts payable;

obtaining a second set of computer data representing a plurality of objectives with respect to the cash flow plan, the objectives including maximizing a minimum daily cash on hand in the finance account and each objective associated with a weight indicating the importance of the objective; and modifying the first set of computer data representing the genome population by use of a genetic algorithm, including:

determining a fitness for each of the vectors in the genome population using objective values, the objective values determined by applying objective functions to the vectors, each objective value weighted by the corresponding weight; and introducing new vectors in the genome population derived from other vectors including the first set of vectors, until at least one of the vectors in the genome population represents the cash flow plan, such that payment of each payment obligation in the accounts payable in accordance with the cash flow plan maximizes the minimum daily cash on hand in the finance account while satisfying the objectives, wherein introducing new vectors in the genome population comprises:

selecting mating vectors from the first set of vectors based on the fitness of each of the first set of vectors;

mating the selected mating vectors to obtain a second set of vectors;

mutating the second set of vectors to obtain a third set of vectors; and replacing selected ones of vectors in the first set of vectors in the genome population with the third set of vectors, and wherein replacing selected ones of vectors in the first set of vectors comprises:

adding the third set of vectors to the first set of vectors to obtain a modified first set of vectors;

determining fitness of each vector in the modified first set of vectors;

removing a first predetermined number of the worst vectors from the modified first set of vectors based upon the determined fitness of the modified first set of vectors; and adding a second predetermined number of the best vectors in the first set of vectors to the modified first set of vectors based upon the determined fitness of the first set of vectors.

3. A computer-implemented method of determining a cash flow plan corresponding to a plurality of payment obligations in accounts payable of a finance account while satisfying at least one objective, the computer-implemented method comprising:

generating a first set of computer data representing a genome population having a first set of vectors, each vector in the first set of vectors representing the cash flow plan, numerically defining a payment date and a payment amount corresponding to each payment obligation in the accounts payable;

obtaining a second set of computer data representing a plurality of objectives with respect to the cash flow plan, the objectives including maximizing a minimum daily cash on hand in the finance account and each objective associated with a weight indicating the importance of the objective; and modifying the first set of computer data representing the genome population by use of a genetic algorithm, including:

determining a fitness for each of the vectors in the genome population using objective values, the objective values determined by applying objective functions to the vectors, each objective value weighted by the corresponding weight; and introducing new vectors in the genome population derived from other vectors including the first set of vectors, until at least one of the vectors in the genome population represents the cash flow plan, such that payment of each payment obligation in the accounts payable in accordance with the cash flow plan maximizes the minimum daily cash on hand in the finance account while satisfying the objectives, wherein determining a fitness for each vector comprises:

obtaining objective values $O_G$ corresponding to the associated objectives, each objective value representing a degree to which the associated objective is satisfied when the payment obligations are paid in accordance with the cash flow plan represented by the vector;

normalizing and standardizing each of the objective values $O_G$ to obtain normalized, standardized objective values $O_i$ corresponding to each of the objectives;

obtaining a composite objective value $O_{comp}$ corresponding to the vector by the following equation:

$$O_{comp} = \sum_{i=1}^{n} w_i O_i$$

where $O_{comp}$ is the composite objective value corresponding to the vector;

$O_i$ is the normalized, standardized objective value corresponding to each of the objectives;

$w_i$ is the weight corresponding to each objective; and
$n$ is the number of objectives; and applying a fitness function to the composite objective value $O_{comp}$ to obtain a fitness score corresponding to the vector.

4. The computer-implemented method of claim 3, wherein the fitness function comprises:

$$F = O_{comp} - (O_{average} - 2 \cdot O_\sigma)$$

where F is the fitness score corresponding to the vector;
$O_{comp}$ is the composite objective value corresponding to the vector;
$O_{average}$ is an average of the composite objective values corresponding to all the vectors in the genome population; and
$O_\sigma$ is a standard deviation of the composite objective values corresponding to all the vectors in the genome population.

5. The computer-implemented method of claim 3, wherein the weight is a user-specified value.

6. The computer-implemented method of claim 3, wherein the weights add up to one.

7. The computer-implemented method of claim 3, wherein the normalized, standardized objective value $O_i$ corresponding to each objective is obtained by dividing a difference between the objective value $O_G$ and a best possible objective value with a normalizing factor.

8. The computer-implemented method of claim 7, wherein the normalizing factor is a difference between the best possible objective value and a worst possible objective value.

9. The computer-implemented method of claim 3, wherein the associated objectives comprise maximizing a minimum daily cash on hand in the finance account, and the normalized, standardized objective value $O_i$ for the objective of maximizing the minimum daily cash on hand is obtained by:

$$O_i = |O_A - O_G|/|O_A - O_Z|,$$

where $O_A$ is the minimum daily cash on hand that would be available when none of the payment obligations in the accounts payable is paid;
$O_Z$ is the minimum daily cash on hand that would be available when all the payment obligations in the accounts payable are paid on an initial day; and
$O_G$ is total cash generated when the payment obligations in the accounts payable are paid in accordance with the cash flow plan represented by the vector.

10. The computer-implemented method of claim 3, wherein the associated objectives comprise minimizing late payment penalties, and the normalized, standardized objective value $O_i$ for the objective of minimizing late payment penalties is obtained by:

$$O_i = |O_A - O_G|/|O_A - O_Z|,$$

where $O_A$ is a zero;
$O_Z$ is a sum of all late payment penalties associated with the payment obligations when all the payment obligations are paid late; and
$O_G$ is the total amount of late payment penalties to be paid when the payment obligations are paid in accordance with the cash flow plan represented by the vector.

11. The computer-implemented method of claim 3, wherein the associated objectives comprise maximizing tax deduction, and the normalized, standardized objective value $O_i$ for the objective of maximizing tax deduction is obtained by:

$$O_i = |O_A - O_G|/|O_A - O_Z|,$$

where $O_A$ is the amount of tax deduction available when all the payment obligations are tax deductible;
$O_Z$ is zero; and
$O_G$ is the amount of tax deduction available when the payment obligations are paid in accordance with the cash flow plan represented by the vector.

12. The computer-implemented method of claim 3, wherein the associated objectives comprise minimizing the number of check runs, and the normalized, standardized objective value $O_i$ for the objective of minimizing the number of check runs is obtained by:

$$O_i = |O_A - O_G|/|O_A - O_Z|,$$

where $O_A$ is zero;
$O_Z$ is equal to the number of payment obligations; and
$O_G$ is the required number of check runs when the payment obligations are paid in accordance with the cash flow plan represented by the vector.

13. The computer-implemented method of claim 3, wherein the associated objectives comprise minimizing the number of check runs per vendor, and the normalized, standardized objective value $O_i$ for the objective of minimizing the number of check runs per vendor is obtained by:

$$O_i = |O_A - O_G|/|O_A - O_Z|,$$

where $O_A$ is 0;
$O_Z$ is equal to the number of payment obligations to the vendor; and
$O_G$ is the number of check runs for the vendor when the payment obligations are paid in accordance with the cash flow plan represented by the vector.

14. The computer-implemented method of claim 3, wherein the associated objectives comprise minimizing a total postage fee, and the normalized, standardized objective value $O_i$ for the objective of minimizing the total postage fee is obtained by:

$$O_i = |O_A - O_G|/|O_A - O_Z|,$$

where $O_A$ is a total postage fee when all payments corresponding to the payment obligations are mailed by using a lowest available postage;
$O_Z$ is a total postage fee when all payments corresponding to the payment obligations are mailed using a most expensive available postage; and
$O_G$ is a total postage fee that would be incurred when the payment obligations are paid in accordance with the cash flow plan represented by the vector.

15. The computer-implemented method of claim 3, wherein the associated objectives comprise minimizing regret value, and the normalized, standardized objective value $O_i$ for the objective of minimizing regret value is obtained by:

$$O_i = |O_A - O_G|/|O_A - O_Z|,$$

where $O_A$ is 0;
$O_Z$ is 1; and
$O_G$ is the average regret value when the payment obligations are paid in accordance with the cash flow plan represented by the vector.

16. A computer program product for determining a cash flow plan corresponding to a plurality of payment obligations in accounts payable of a finance account while satisfying at least one objective, the computer program product stored on a computer readable medium and adapted to cause a computer to perform a computer-implemented method comprising:

generating a first set of computer data representing a genome population having a first set of vectors, each vector in the first set of vectors representing a cash flow plan, numerically defining a payment date and a payment amount corresponding to each payment obligation in the accounts payable;

obtaining a second set of computer data representing a plurality of objectives with respect to the cash flow plan, the objectives including maximizing a minimum daily cash on hand in the finance account and each objective associated with a weight indicating the importance of the objective; and modifying the first set of computer data representing the genome population by use of a genetic algorithm, including:
- determining a fitness for each of the vectors in the genome population using objective values, the objective values determined by applying objective functions to the vectors, each objective value weighted by the corresponding weight; and
- introducing new vectors in the genome population derived from other vectors including the first set of vectors, until at least one of the vectors in the genome population represents the cash flow plan, such that payment of each payment obligation in the accounts payable in accordance with the cash flow plan maximizes the minimum daily cash on hand in the finance account while satisfying the objectives, wherein determining a fitness for each vector comprises:
- obtaining objective values $O_G$ corresponding to the associated objectives, each objective value representing a degree to which the associated objective is satisfied when the payment obligations are paid in accordance with a cash flow plan represented by the vector;
- normalizing and standardizing each of the objective values $O_G$ to obtain normalized, standardized objective values $O_i$ corresponding to each of the objectives;
- obtaining a composite objective value $O_{comp}$ corresponding to the vector by the following equation:

$$O_{comp} = \sum_{i=1}^{n} w_i O_i$$

where $O_{comp}$ is the composite objective value corresponding to the vector;

$O_i$ is the normalized, standardized objective value corresponding to each of the objectives;

$w_i$ is the weight corresponding to each objective; and n is the number of objectives; and applying a fitness function to the composite objective value $O_{comp}$ to obtain a fitness score corresponding to the vector.

17. The computer program product of claim 16, wherein the fitness function comprises:

$$F = O_{comp} - (O_{average} - 2 \cdot O_\sigma)$$

where F is the fitness score corresponding to the vector;

$O_{comp}$ is the composite objective value corresponding to the vector;

$O_{average}$ is an average of the composite objective values corresponding to all the vectors in the genome population; and $O_\sigma$ is a standard deviation of the composite objective values corresponding to all the vectors in the genome population.

* * * * *